United States Patent
Binnig et al.

[11] Patent Number: 6,076,397
[45] Date of Patent: Jun. 20, 2000

[54] POSITIONING APPARATUS

[75] Inventors: Karl Gerd Binnig, Wollerau; Walter Haeberle, Waedenswil; Heinrich Rohrer, Richterswil, all of Switzerland

[73] Assignee: International Business Machines Corporation, Armonk, N.Y.

[21] Appl. No.: 08/982,106

[22] Filed: Dec. 1, 1997

[51] Int. Cl.[7] ................................................. G01B 5/28
[52] U.S. Cl. ................................................. 73/105
[58] Field of Search ........................... 73/105; 250/306

[56] References Cited

U.S. PATENT DOCUMENTS

| | | | |
|---|---|---|---|
| 3,546,929 | 12/1970 | Bergson | 73/105 |
| 4,343,993 | 8/1982 | Binnig et al. | 250/306 |
| 4,947,042 | 8/1990 | Nishioka et al. | 250/306 |
| 5,808,302 | 9/1998 | Binnig et al. | 250/306 |

*Primary Examiner*—Daniel S. Larkin
*Attorney, Agent, or Firm*—Ronald L. Drumheller

[57] ABSTRACT

The invention relates to a positioning apparatus, providing for an excursion of a tool (12) with respect to a sample or medium to be interacted with. The positioning apparatus comprises apparatus for applying a driving force ($F_D$) which causes the excursion of the tool (12). Counteracting apparatus is provided which exerts a counteracting force ($F_C$) to the driving force ($F_D$). The counteracting apparatus comprises a deformable substance (25) which is mechanically coupled to the tool (12) and effects the counteracting force ($F_C$) and further comprises adjustment means (28) allowing to adjust the deformability of the deformable substance (25).

10 Claims, 5 Drawing Sheets

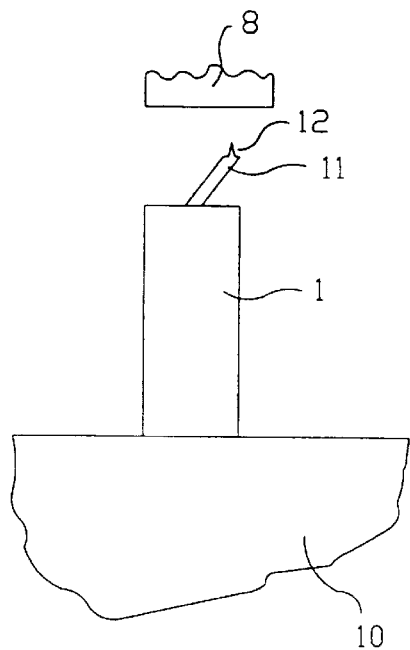
FIG. 3a  t=t₀
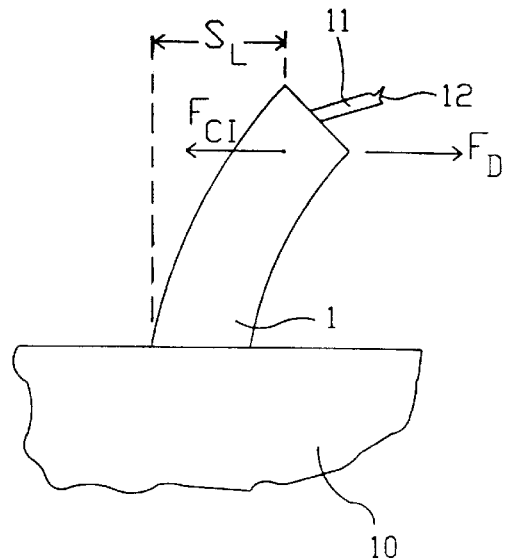
FIG. 3b  t=t₁
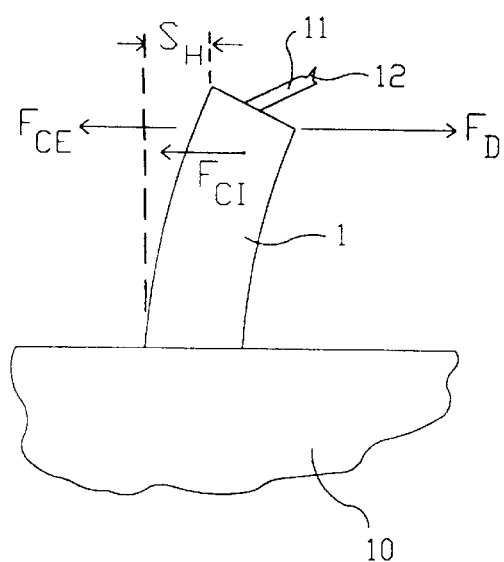
FIG. 4

POSITIONING APPARATUS

The invention relates to a positioning apparatus for a tool which may be moved over a sample to be investigated or modified. The tool may particularly be realized in the form of a sensing tip. More particularly, the invention relates to a combined coarse- and fine-positioning apparatus with a very high resolution up to atomic resolution for use in scanning probe systems, such as scanning probe microscope systems and scanning probe storage systems, or other sensing systems.

BACKGROUND OF THE INVENTION

One technical field of the invention is the field of scanning probe techniques evolving from the invention of the Scanning Tunneling Microscope (STM) by G. Binnig and H. Rohrer in 1982. The STM, which is described for example in the U.S. Pat. No. 4,343,993, triggered the development of a huge variety of instruments. These instruments are designed to investigate and manipulate surfaces and/or atoms or molecules placed on top of them even with atomic precision. An often used feature of scanning a probe instruments is a fine tip, also called probe, with a radius of curvature at its apex of 100 nm or below. The probe is scanned over the surface of a sample by using coarse- and fine-positioning units. The STM and its derivatives are scientific tools which can be used for all kinds of surface analysis and imaging of submicroscopic phenomena as well as surface modification or lithographic techniques on the nm scale.

Besides the STM, scanning probe techniques include the Atomic Force Microscope (AFM), which was invented by G. Binnig in 1986 (U.S. Pat. No. 4,724,318) and subsequently further developed, as for example described in U.S. Pat. No. 5,144,833. Images of magnetic domains have been obtained by Magnetic Force Microscopy, as described by H. J. Mamin et al. in: Appl. Phys. Lett. 55 (1989), pp. 318ff.

A Scanning Capacitance Microscope is known from the patent U.S. Pat. No. 5,065,103, a Scanning Acoustic Microscope from U.S. Pat. No. 4,646,573, and a Scanning Thermal Profiler from U.S. Pat. No. 4,747,698. The scanning probe technique is also used in light microscopes having a resolution not limited by diffraction. In these so-called Scanning Near-field Optical Microscopes, described for example in U.S. Pat. No. 4,604,520, the probe essentially consists of a light waveguide ending in a tiny aperture which either receives or emits light within the proximity of the surface of a sample.

For the purpose of this invention, all these as well as related techniques are referred to as scanning probe microscopy (SPM). SPM crucially depends on an accurate scanning system sample. By a generally acknowledged convention, the directions within a plane parallel to the surface of the sample are denoted by 'x' and 'y', whereas the direction perpendicular to this plane is commonly referred to as 'z-axis'.

The scanning system as such has a decisive impact upon the resolution of the scanning probe device. For achieving atomic resolution, it must be able to perform controllable displacements with an accuracy of 0.1 nm or less with the requirements for the z-direction usually being even more vigorous than those for the other directions. An ideal scanning system for scanning probe devices should combine a large scanning range in the x, y-plane with an accurate control of the position of the tip relative to the sample in all three dimensions, in particular in the z-direction. As both requirements are difficult to fulfill, known SPM devices apply two-stage positioning systems: coarse-positioners move the sample close to a desired position on the probe until the distance ranges can be covered by fine-positioners. The fine-positioners alone deliver the required accuracy and thus enable imaging and manipulation with atomic resolution.

Many different approaches and techniques have been applied as a coarse-positioner, including a manual approach using levers or differential springs, a piezo-electric walker mechanism (louse), or a stepping motor coupled to the sample or scanning stage. Magnetic coarse-positioners are described for example in the European patent EP-B-0 290 522 and in the US patent U.S. Pat. No. 4,947,042. The most advanced types of coarse-positioner, in particular when controlled by interferometry, achieve a positioning precision of a few tenths of a micrometer and thus barely overlap with the scanning range of the fine-scanner.

Fine-scanning techniques from the very beginning of scanning probe microscopy converged to using piezoelectric elements. Examples for fine scanning stages are for example known from the patent U.S. Pat. No. 4,520,570 and from G. Binnig and D. P. E. Smith, "Single-tube three-dimensional scanner for scanning tunneling microscopy", published in Rev. Sci. Instruments 57 (1986), p: 1688.

C. Gerber and O. Marti further proposed a magnetostrictive scanner in IBM's Technical Disclosure Bulletin Vol. 27, No. 11, April 1985, p. 6373, in which the piezoelectric elements are replaced by rods made of magnetostrictive material. This material elongates and contracts under the influence of an magnetic field similar to the behavior of a piezoelectric element in an electric field.

It is important for the scope of this invention to notice that even those techniques which apply a magnetism-based coarse-positioning stage, as e.g. described in patents EP-B-0 290 522 and U.S. Pat. No. 4,947,042, rely upon a piezoelectric fine-scanner. Though the piezoelectric fine-scanner is a versatile tool, it exhibits several disadvantages. Primarily, the elongations which can be achieved, range around 2 to 5 nm/V, i.e. a voltage of 1000 V is required to achieve a scan range of 2 to 5 micrometer, which for all practical purpose; limits the range to a few micrometers. In addition, with an increasing voltage, non-linear effects become noticeable with the elongation of the piezoelectric material being no longer proportional to the applied voltage. On the other hand, it requires a complex and accurate control system for applying the necessary voltages to the electrodes attached to the piezoelectric material.

The described examples are meant to illustrate the broad usage of scanning probe techniques but do not cover all applications feasible for the invention. It is, for example, known to a skilled person that the storage density of common storage devices, such as hard disks, is directly dependent on the accuracy at which a write/read head can be positioned relative to the storage medium. An inexpensive, accurate method of positioning the write/read head with atomic precision has an immediate impact in this technical field. In particular, scanning probe storage systems require an accurate scanning system.

A scanning tunneling storage system has been proposed in the European patent EP 247 219, for example. This system comprises current detectors being attached to an array of cantilevers. A storage medium is placed opposite to the array. The storage medium is displaced by means of a two-dimensional piezoelectric positioning device. There is no adequate approach disclosed for erasing the stored information.

U.S. Pat. No. 5,307,311 a memory device is described which makes use of a very large set of independently operating subdevices. It employs an array of hundreds of microcantilevers having an area in which bits are stored. Opposite to these cantilevers there are hundreds of read/write heads which are similar in nature to scanning tunneling or atomic force microscope scanning tips. Each cantilever is moved in an oscillatory manner such that the respective read/write head scans over the bits stored thereon.

A fine-positioning apparatus with atomic resolution is disclosed in the pending PCT patent application PCT/EP 94/02844 entitled "Fine positioning apparatus with atomic resolution". It is a characteristic feature of the fine-positioning apparatus described therein that it comprises an actuator based on the principle of magnetic induction or magnetomotive force. The effect of magnetic induction is characterized by the force that a magnetic field or the change of a magnetic field exerts upon a permanent # magnet, a current-carrying conductor, or an otherwise magnetized material within this field.

OBJECT AND ADVANTAGES OF THE INVENTION

The invented positioning apparatus has the advantage that its spatial resolution can be modified by changing the deformability of at least one deformable substance. This unifies a coarse and a fine-positioning apparatus. It further allows one to modify the mechanical behavior of the tool concerning its control. Additionally, to change the deformability is a very easy and quick-responding way of controlling the stiffness and/or the damping of the mechanical system of positioning. Another advantage is that the deformability allows the tool to be adjusted smoothly or even abruptly according to the choice of the user.

To use an environmental condition, e.g. pressure, temperature, ph-value, chemical environment, humidity, etc. to change the deformability is advantageous, since the deformability is a physical quantity which is sensitive to such conditions. Furthermore, such conditions can be easily controlled.

To switch between different states is a very cost-inexpensive and easy-to-implement way of realizing a switch-like behavior of the deformability.

When the tool is attached to a cantilever, the whole range of applications that is known about such cantilever arrangements, such as measurement of angle, distance and or height, use of the cantilever's elasticity, use of the arrangement for AFM etc., is accessible with the invented apparatus.

To apply a tool holder for the tool with the cantilever, brings the advantage that a very small cantilever and a very small tool can be combined with a positioning apparatus and a tool holder that have bigger dimensions, preferably dimensions that are in the range of mm to cm. This simplifies the mechanical construction of the positioning apparatus. When the counteracting force is acting on the tool holder, this is the nearest position to the tool without interfering with the functionality of the cantilever. Such a near position guarantees an optimal control.

To use a force-transmitting element, e.g. one or more rods, gears, wheels, levers, or any mixtures therefrom etc., makes it possible that the deformable substance can be arranged away from the tool. This makes it easier to realize more complex, sophisticated and hence space-consuming mechanical arrangements comprising the deformable substance. Furthermore, the environmental condition of the deformable substance can be decoupled from the environmental conditions of the tool which may prove extremely important, for instance concerning temperature. To all this adds the possibility of introducing a gear of arbitrary transmission.

To use spring means in the positioning apparatus is advantageous because by this measure, damping and restoring force types can be used to provide for the counteracting force.

When the mechanical coupling of the spring means to the tool holder and/or the deformable substance depends on the deformability of the substance, the spring constant can be chosen fixed but be varied in its effect by changing the deformability. Hence the spring can have no effect on the movement of the tool as well as have full effect, depending on the value of deformability chosen.

The apparatus is especially suitable for the z-movement of the tip because in this direction a coarse- and a fine-positioning is nearly always needed. Furthermore, the z-position is most important because it is the position which decides the distance between the tool and the sample to be worked on or investigated.

The use of a gap between two walls as a container for the deformable substance is of advantage since it provides the best mechanical impact relative to the change in deformability. This means that the resulting effect of the deformability change is very predictable and homogeneous, particularly when the gap is very thin. Then, effects which merely affect the interaction inside of the deformable substance but not the interaction with the walls, will be minimized. Additionally the amount of needed deformable substance is reduced and the achievable effect related to a predetermined change in environmental condition which effects a change in the deformability, is increased by reducing the gap thickness. Hence, by choosing a certain gap thickness, the range of value of the environmental condition to achieve a certain change in the deformability is adjustable.

The positioning apparatus can particularly comprise an inductive actuator. The use of an inductive actuator bears the advantage of being easily moveable by applying low voltages, whereas the known piezoelectricity-based technology requires voltages which can be dangerous for an unexperienced user. The components of inductive actuators are inexpensive and suitable for mass-production. There is a continuing demand for improved, more reliable and more precise positioning systems. In particular, the control and driving of current positioning systems needs to be improved in order to be able to realize simpler and cheaper sensing systems.

The positioning apparatus allows one to easily switch between coarse and fine motion. This allows the apparatus to realize a so-called zoom-in function. Such a zoom-in allows a scanning tip to be scanned across a sample with large scan excursion and low spatial resolution until a position is reached which the user wants to inspect more closely. At this position he may want to zoom-in which can be done by switching from coarse to fine motion. It is advantageous that a zoom-in mechanism is realized using the same positioning apparatus.

Therefore, it is an object of the present invention to provide a reliable, accurate, and easy-to-use coarse- and fine-positioning apparatus, especially suitable for sensing systems, such as scanning probe instruments and scanning probe storage devices.

It is a particular object of the invention to provide such a fine-positioning apparatus which is able to control and alter the position of a probing tip or read/write head relative to a surface face of a sample or the storage medium with an accuracy or resolution of at least 100 nm, preferably of 100 nm to 0.01 nm.

SUMMARY OF THE INVENTION

The present invention relates to a positioning apparatus for a tool, particularly for use in different kinds of systems, such as e.g. sensing systems. In such a sensing system, a tip is scanned relative to a surface, e.g. a sample to be investigated or a storage medium to be accessed. The positioning apparatus comprises means for applying a driving force to said tip causing a movement thereof, e.g. to arrive at a predetermined excursion. Counteracting means are provided which exert a counteracting force on said tip such that it counteracts with said driving force. The counteracting means comprises a deformable medium, such as a fluid, the mechanical behavior of which is controllable. This behavior may be the stiffness of the counteracting means when an elastic deformation is used and/or the damping characteristic of the counteracting means in the case when a plastic deformation is used. Various combinations of plastic and elastic deformation can be realized, depending on the wanted behavior of the deformable medium. The damping controls the velocity of the motion while the stiffness determines the movement or excursion via a restoring force. If the stiffness is small, the positioning apparatus provides for a large excursion, mainly defined by said driving force. With increasing stiffness, the excursion for the same driving force is reduced. Concerning damping, a high damping implies a low velocity of the tip movement while for the same driving force a low damping implies a high velocity. This implies that the tip positioning resolution of the scanning probe system is increased. Counteracting means using plastic deformation allow also large excursions and may therefor require an excursion monitoring means. Therefore, such counteracting means is preferably used for a motion like the z-approach of the tool to the sample. An elastic deformation used in the counteracting means is preferably used for a scanning motion of the tool over the sample and may be used without a separate monitoring.

A fluid substance may be employed whose viscosity depends on the temperature. This fluid substance may be kept in a container where it can be heated and/or cooled. The damping characteristic of the fluid substance depends on its viscosity. At low viscosity, the damping is small, and at high viscosity the damping increases.

Many materials change on cooling from a predominantly plastic or viscous state to a predominantly elastic behavior. In materials with a well-defined melting temperature, a changeover from a state with rather low viscosity to a predominantly elastic behavior occurs in a small temperature interval. Such materials may be used to realize a counteracting means which acts almost like a switch and thus enables one to change the stiffness and/or the damping of the counteracting means.

A fluid substance may be employed which can be solidified or frozen by lowering the temperature. If this fluid substance is kept at a temperature above its melting temperature, the viscosity is small or negligible. If the substance is cooled, it solidifies and the viscosity increases. Such a substance which can be changed in its state allows one to realize counteracting means which act almost like a switch. When talking of viscosity concerning the invention, any internal effect that causes friction towards an adjacent material shall be included, hence conditions of laminar flow are not assumed.

In another embodiment, there is also a fluid substance employed in the means for adjusting the z-distance between the tip of a sensing system and a sample to be scanned.

The present invention allows one to realize scanning probe systems and other sensing systems whose scan movement can be precisely controlled by adjusting the behavior of the deformable medium, e.g. a fluid substance. It has the advantage over conventional mechanical positioning systems in that the scan excursion can be easily adjusted by controlling the behavior of the fluid substance.

It is a preferred embodiment's feature that the damping and/or stiffness of the counteracting means depends on the behavior of a fluid substance, i.e. damping and/or stiffness cause a control over a desired excursion. The larger an introduced stiffness is, the smaller the excursion (if the driving force is kept constant) becomes, i.e. the resolution or sensitivity is increased.

These and other novel features believed characteristic of the invention and its preferred embodiments are set forth in the appended claims. The invention itself however, as well a preferred mode of use, and further objects and advantages thereof, will best be understood by reference to the following detailed description of illustrative embodiments when read in conjunction with the accompanying drawings.

DESCRIPTION OF THE DRAWINGS

The invention is described in detail below with reference to the following drawings:

FIG. 3a shows a side view of a tool holder with cantilever and tip under exertion of a driving force $F_D$ according to FIG. 2 at the time $t=t_0$, FIG. 3b shows a side view of a tool holder with cantilever and tip under exertion of a driving force $F_D$ according to FIG. 2 at the time $t=t_1$.

FIG. 4 shows a side view of a tool holder with cantilever and tip under exertion of a driving force $F_D$ and with an extrinsic counteracting force $F_{CE}$.

DETAILED DESCRIPTION

Referring to FIGS. 1 through 3b, the function of a positioning apparatus is explained in connection with a special sensing system, namely a scanning probe system comprising a cantilever.

Figure 1:
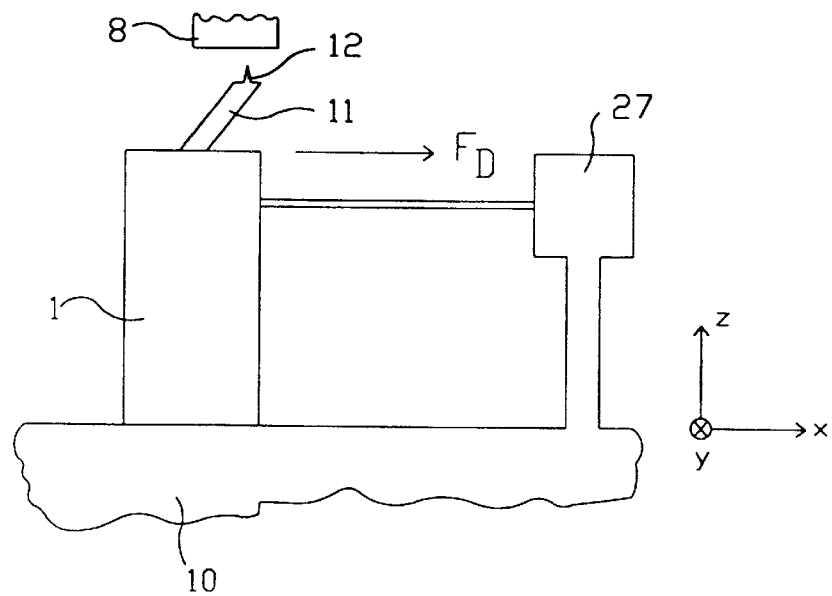
FIG. 1 shows a side view of a tool holder with a cantilever and a tip.

A probe arrangement is illustrated in FIG. 1. It comprises a cantilever 11 being an integral part of, or being attached to a tool holder 1 which is attached to an actuator 10. The cantilever 11 carries a tool 12. For example, here a tip is used as tool 12. The actuator 10, also called positioning apparatus, forms part of a scanning probe system and allows one to scan the tool 12 in the x-y plane by moving the tool holder 1 and provides for a scan movement of the tool 12 relative to a sample 8 to be investigated or storage medium to be scanned. The positioning apparatus 10 exerts a driving force $F_D$ on the tool holder I via a driving means 27 which here acts on the free end of the tool holder 1. The driving force $F_D$ has a function which depends on the time t. It is used as a means to control the movement and the position of the tool 12 relative to the sample 8 or storage medium. Thereby, the driving force $F_D$ is controlled with a predetermined force resolution; i.e. a certain minimal force unit exists which causes a predetermined minimal movement unit in the scanning movement of the tool 12.

Figure 2:
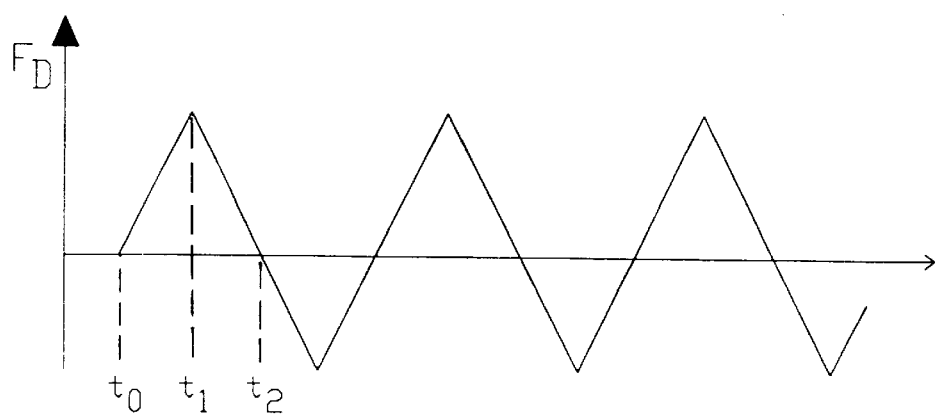
FIG. 2 is a diagram giving an example of the driving force $F_D$ as a function of the time t.

An example of the driving force $F_D$ is illustrated in FIG. 2. As shown in the diagram of FIG. 2, the driving force $F_D$ may be an alternating force, such as a force with a triangular function shape. At the time $t=t_0$, the driving force $F_D=0$ and at the time $t=t_1$, the driving force $F_D$ reaches a maximum.

The resulting scan movement of the tool holder 1 is illustrated in FIGS. 3a and 3b. At the time $t=t_0$, the driving force $F_D=0$ and the tool holder 1 is positioned in an unactuated position (FIG. 3a).

At $t=t_1$ the driving force $F_D$ has reached its maximum value and the tool holder 1 is bent, as illustrated in FIG. 3b. Due to the bending, the elasticity of the tool holder 1 provides for an intrinsic counteracting force $F_{CI}$, which is proportional to the excursion of the end of the tool holder 1. Since acceleration and deceleration forces are usually very small compared to the driving force $F_D$, they may be neglected. Then the driving force $F_D$ and the intrinsic counteracting force $F_{CI}$ are in equilibrium. The resulting maximum scan excursion of the tool holder 1 is indicated as $S_L$ in FIG. 3b. For a given bending stiffness of the tool holder 1, here a large scan excursion is achieved. This simultaneously relates to a low spatial resolution of the scanning control of the tool holder 1, respectively the tool 12. Therefore the scan excursion is indexed through the letter "L". It is to be understood that the driving force function may have any shape which allows one to realize a scan movement of the tool 12.

When an additional, extrinsic counteracting force $F_{CE}$ is applied to the tool holder 1, the maximal scan excursion with the same driving force function is reduced, as illustrated in FIG. 4. The extrinsic counteracting force $F_{CE}$ shall here be of the restoring type and therefore have the opposite function curve (FIG. 2) as the driving force $F_D$. The resulting maximal scan excursion $S_H$, whose length depends on the strength of the extrinsic counteracting force $F_{CE}$ and of the intrinsic counteracting force $F_{CI}$, is smaller than the maximal scan excursion without the extrinsic counteracting force $F_{CE}$, as shown in FIG. 4. The scan movement is hence demagnified, compared to FIG. 3b. Since the movement range of the tool 12 is decreased while the force resolution of the driving force $F_D$ remains unchanged, the movement resolution and with it the spatial resolution of the tool 12 is increased. To indicate that in this example the extrinsic counteracting force $F_{CE}$ leads to a higher spatial resolution of the tool 12, the scan excursion in FIG. 4 is characterized by the index letter "H". It is to be noted that the extrinsic counteracting force $F_{CE}$ is not necessarily a constant force. The extrinsic counteracting force $F_{CE}$ and the intrinsic counteracting force $F_{CI}$ together form a total counteracting force $F_C$. In the case of damping counteraction means, the value of the counteracting force $F_C$ force also depends on the velocity of the scan movement, for example. The application range (if the invention is particularly covering tool movements from the range of a few cm down to atomic scales, depending on the application.

Figure 5:
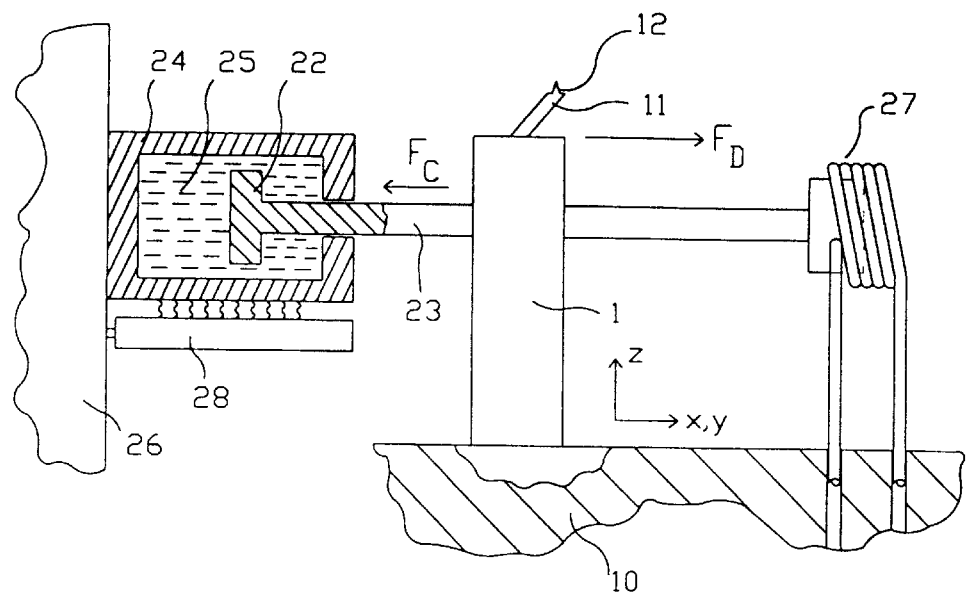
FIG. 5 shows a side view of a tool holder with cantilever and tip under exertion of a driving force $F_D$ and with a counteracting force $F_C$ part of which being induced by a deformable substance in a container.

A first embodiment of the present invention is illustrated in FIG. 5. As in FIG. 1, the probe arrangement comprises the actuator 10, the tool holder 1, the cantilever 11, and the tool 12. The positioning apparatus 10 provides again via the driving means 27 for a driving force $F_D$ which acts upon the free end of the tool holder 1. The positioning apparatus 10 comprises a counteracting means. This counteracting means is realized in the present embodiment by means of a rod 23 with a thereat fixed end plate 22 being coupled to the tool holder 1 and protruding into a container 24. This container 24 comprises a deformable substance 25, e.g. a fluid substance. The container 24 is fixed at a support structure 26. Near the container 24 is arranged an adjustment means 28 which is here realized as a heating means. In the present embodiment, the fluid substance 25 is a substance whose viscosity depends on the temperature, e.g. a polymer.

By adjusting the temperature of the fluid substance 25, using the heating means 28, the mechanical behavior of the fluid substance 25 altered. The counteracting force $F_C$ is again comprises the extrinsic counteracting force $F_{CE}$ and the intrinsic counteracting force $F_{CI}$.

At low viscosity there is almost no interaction of the fluid substance 25 with the rod 23. In this mode of operation, the resulting damping is very small. Depending on the actual design, the damping may even be negligible if the fluid substance 25 is hardly viscous. By lowering the temperature of the fluid substance 25, its viscosity is increased. At high viscosity, the movement of the rod 23 is damped due to the friction between the end plate 22 with the rod 23 and the fluid 25. In this mode of operation, the damping reduces the achievable scan excursion of the cantilever 11 concerning a given duration of time. The friction force constant and thus the damping hence depends on the viscosity of the fluid substance 25.

Fine-resolved motion is obtained in the present embodiment by increasing the viscosity and thus decreasing the scan velocity per driving force $F_D$, which means increasing the demagnification. The counteracting force $F_C$ is here hence a force which is reactive on the driving force $F_D$. Its behavior is predetermined by the deformability or viscosity of the deformable substance 25. Generally, the deformable substance can be of any kind and need not be liquid. The deformation may comprise a pure damping force, pure restoring force, and any combination of them. A restoring force is defined as a force that may effect a return of the tool holder 1 towards its starting position, hence being effected by an energy-storing part of the deformable substance. A damping force, in contrary is defined as a slowing-down force which is not able to move the tool holder 1 actively backwards.

The viscosity of the fluid substance 25 can also be adjusted by employing an electrical heating or cooling system, for example. For instance, a coil may be attached to the container 24 such that a current in said coil increases the temperature of the fluid substance 25. Such an electrical heating system can be easily realized and controlled.

It is to be noted that the container 24 is can also be realized in form of any arrangement where the fluid substance 25 is kept in a gap. Depending on the fluid substance 25 used, the surface tension and/or adhesion forces may then be chosen strong enough to keep the fluid substance 25 in the gap. Not only translatoric movements, but also rotational movements can be controlled, according to the present invention, e.g. if one provides a thin gap between two disks which is filled with the fluid substance 25. Depending on the viscosity or state of this fluid substance 25, the two disks 'stick' to each other such that a rotational movement is counteracted.

The first embodiment can be modified by employing an additional spring and/or damping elements either parallel to or in series with the container 24. Also the shape, size and arrangement of the rod 23, the end plate 22, and the container 24 may be modified. Many different kinds of arrangements are conceivable which allows one to realize counteracting means providing for the desired adjustable damping, respectively counteracting force $F_C$.

Figure 6:
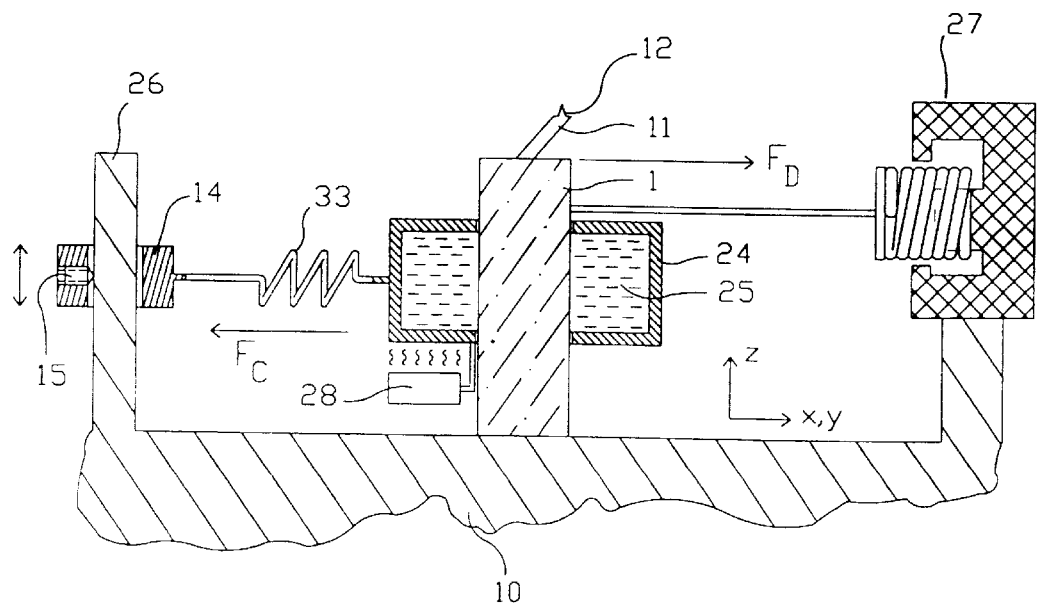
FIG. 6 shows a side view of a tool holder with cantilever and tip under exertion of a driving force $F_D$ and with a counteracting force $F_C$ part of which being induced by a spring.

A second embodiment is illustrated in FIG. 6. The probe arrangement again comprises the actuator 10, the tool holder 1, and the cantilever 11 with the tool 12. The counteracting means is arranged such that it can be moved in parallel to the z-axis. It comprises a spring 33 being at one end fixed at a cuff element 14 which is movably arranged on the support structure 26, which is here formed as an elongated element, and being at the other end fixed at the container 24 filled with the fluid substance 25. The tool holder 1 penetrates through said container 24. The cuff element 14 comprises a fixing screw 15 which may be screwed in towards the support structure 26. The support structure 26 is here united with the actuator 10. The adjustment means 28 is arranged near the container 24. For best thermal coupling, the adjustment means 28 may be attached directly to the container 24. The driving means 27 comprises, as an example, a ferromagnetic or a permanentmagnetic element which is here realized in form of a pot with a central longitudinal element and further comprises a coil which 4 is movably situated on the central longitudinal element. For sake of a better view, the contacts of the coil for supplying it with electrical power are not depicted here. Preferably, to obtain a linear moving characteristic of the driving means 27, the end of the central longitudinal element is located in the interior of the coil such that it remains there in the whole used moving range of the driving means 27. Then, the homogeneous magnetic field inside of the coil at least to a major extent surrounds the inhomogeneous magnetic field at the end of the central longitudinal element. Near the end of the central longitudinal element, the pot has one or several protrusions which are directed versus the coil. Here, such a protrusion is realized in the form of a ring-shaped element which forms a sort of cover of the pot. This or these protrusions serve to concentrate the inhomogeneous field at the end of the central longitudinal element to a smaller range, which increases the linearity. However, generally, the pot is not necessary for this type of driving means 27.

Depending on the behavior of the fluid substance 25, the container 24 is either clamped to the tool holder 1, namely if the fluid substance 25 has high viscosity, or it can be moved in parallel to the z-axis if the viscosity of the fluid substance 25 is low. Such movement can be induced artificially by corresponding means or be an effect caused by already present forces, e.g. gravity. A clamping via the control of the viscosity will then determine the position of the counteracting means relative to the tool holder 1. Also an application is possible where the viscosity is chosen such that during movement of the tool holder the position of the container 24 and or the cuff-element 14 is changing. This may also be effected or assisted by changing the viscosity during the movement via the adjustment means 28.

If the container 24 and spring 33 are clamped at a position close to the free end of the tool holder 1, the resulting counteracting force $F_C$ is mainly defined by the spring constant of the spring 33. If the container 24 is moved towards the fixed end of the tool holder 1, the resulting effect of the spring 33 on the counteracting force $F_C$ is reduced because the tool holder 1 serves as a lever. The more the container 24 approaches the fixed end of the tool holder 1, the less impact the spring 33 has on the scan movement caused by the driving force $F_D$, i.e., the maximum scan excursion at a given driving force $F_D$ is approached. Due to the fact that the container 24 is movable, the effective lever length of the tool holder 1 and with it the resulting counteracting force $F_C$ can be varied. A small scan excursion is obtained if the container 24 is located close to the free end of the tool holder 1. The cuff element 14 may be used to fix the height of the container 24 with the spring 33, in that the fixing screw 15 is used. Any other fixing arrangement is also possible instead of the cuff element 14 with the fixing screw 15, e.g. a viscous clamping element as represented by container 24, substance 25, and adjustment means 28.

Figure 7:
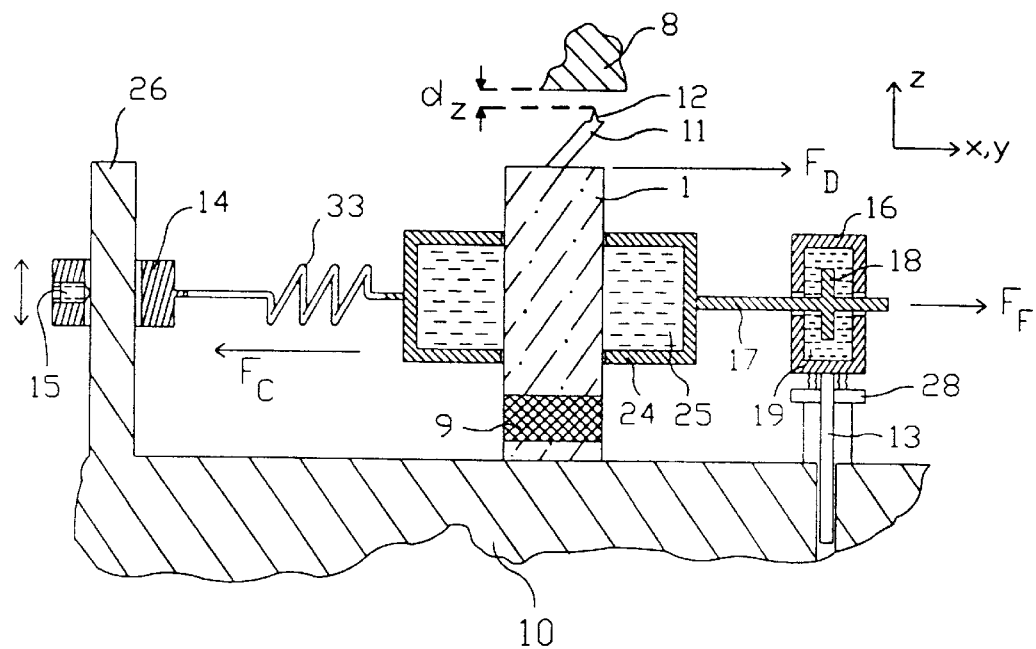
FIG. 7 shows a side view of a tool holder with cantilever and tip under exertion of a driving force $F_D$ and with a counteracting force $F_C$ part of which being induced by a spring and with a zoom arrangement.

In FIG. 7, another embodiment of the present invention is shown. In this schematic figure, again the cantilever 11 with the tip 12 is arranged on the tool holder 1. The tool holder 1 has a soft section 9 close to its fixed end. Again)the container 24 filled with the fluid substance 25 is attached via the spring 33 to the cuff element 14 to the support structure 26. The tip 12 has a distance $d_z$ from the sample 8. The container 24 has fixed to it an assistant rod 17 which comprises a friction plate 18 and protrudes through an assistant container 16 which is filled with an assistant fluid substance 19. The friction plate 18 is thereby positioned inside the assistant container 16 to produce an assistant counteracting force $F_F$. The assistant container 16 has attached to it an elongated spring 13 which is shiftably borne in the actuator 10. The assistant container 16, assistant rod 17, friction plate 16, assistant fluid substance 19 and elongated spring 13 together form an assistant counteracting means. The adjustment means 28 and the driving means 27 shown in FIG. 6 are here not shown, for sake of clarity. However it should be clear, that any type of adjustment means and driving means may be used here, particularly the types shown in FIG. 6.

The soft section 9 is here designed such that the tool holder 1 gets shorter if a force is applied which compresses the tool holder 1. If a force is applied which pulls at the tool holder 1, it gets longer. The driving force $F_D$ provides for a scan movement in the x-y plane of the tip 12 relative to the surface of the sample 8. The spring constant of the spring 33 and the z-position at which the container 24 interacts with the tool holder 1 defines the counteracting force $F_C$ and thus the scan movement. The z-position can be controlled by shifting the counteracting means along the z-axis. Thereby also the assistant counteracting means is shifted which is movably borne in the actuator 10. The assistant counteracting means may be used as a zoom arrangement, characterized by the possibility to use the same range of the driving force $F_D$ for different resolutions of the scan movement of the tip 12. This is achieved by allowing, firstly, a scan movement towards a predetermined position while keeping the viscosity of the assistant fluid substance 19 low, hence quasi-decoupling the spring force of the assistant counteracting means from the tool holder 1 and, secondly, after having moved the tool holder 1 and approached the predetermined position to a certain extent, clamping the assistant counteracting means to the tool holder 1 by increasing the viscosity of the assistant fluid substance 19. Thus, in the extreme case, the position of the friction plate 18 inside the assistant container 16 is frozen or fixed when it has approached the predetermined position and the elongated spring 13 is then mechanically coupled in parallel to the spring 33. This then means also that further increasing the deformability above a certain level, namely the frozen state does no longer significantly change the mechanical behavior of the system because the elongated spring 13 is then in any case dominating.

The elongated spring 13 may be chosen with a very high spring constant such that it serves to fix the tool holder 1 in the approached position. The driving force $F_D$ may then be set back to zero with only a negligible change of the position of the tool holder 1. Thus, the driving force $F_D$ can now be used to perform a high-resolved scan movement of the tip 12 with a small scan range, useable for performing a fine-positioning. The assistant counteracting means is hence acting as a zoom arrangement. This zoom arrangement can also be used without using the counteracting means, hence independently from it. The counteracting means may then be omitted. The zoom arrangement need not be shiftable along the tool holder 1 but can also be arranged at a fixed position which facilitates the design of the whole arrangement. Also a set of several zoom arrangements is combinable, e.g. at different positions and/or with different spring constants, respectively stiffnesses. The zoom arrangements may also be arranged interacting with each other, or building a multi-stage zooming system with one or more elongated springs 13 comprising again a zoom arrangement which may be used to vary its spring constant, respectively bending curve.

By altering the mechanical behavior of the fluid substance 25 in the container 24, the container 24 can be clamped to or released from the tool holder 1. In the present embodiment, the counteracting means may also be used to allow one to adjust the distance $d_z$ between tool 12 and the surface of the sample 8. If the container 24 is clamped at the free end of the tool holder 1 and the cuff element 14 is fixed at a lower position with respect to the actuator 10, the spring 33 pulls the tool holder 1 and cantilever 11 away from the sample 8 such that the distance $d_z$ is increased. This is also possible when the tool holder 1 is soft such that its length can be reduced. If the container 24 is positioned and clamped at the fixed end of the tool holder 1 and the cuff element 14 is fixed at a higher position with respect to the actuator 10, the spring 33 pulls the tool holder 1 and cantilever 11 such that the distance $d_z$ is reduced. If the fluid substance 25 is a viscous medium, it also damps the z-movement of the tool holder 1 and cantilever 11. This e.g. reduces the risk of damaging the tip 12.

Figure 8:
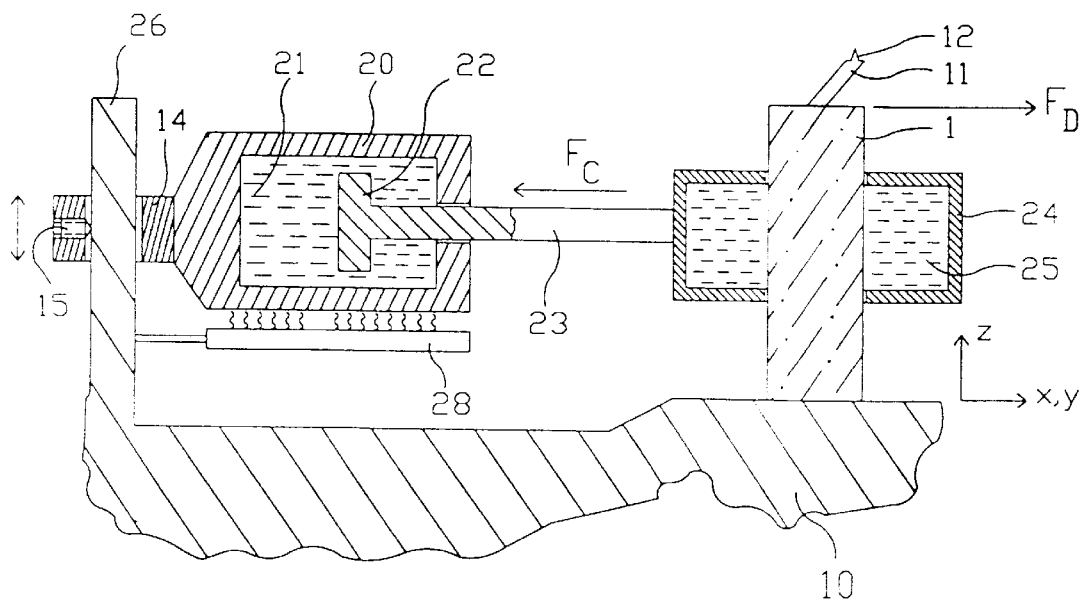
FIG. 8 shows a side view of a tool holder with cantilever and tip under exertion of a driving force $F_D$ and with a counteracting force $F_C$ part of which being induced by a fluid substance in a container which is shiftable in the z-direction.

The embodiment shown in FIG. 6 can be further modified in that the spring 33 is replaced by an additional container 20 with an additional fluid substance 21, as illustrated in FIG. 8. The probe arrangement again comprises the actuator 10, the tool holder 1, and the cantilever 11 with the tool 12. The counteracting means is arranged such that it can be moved in parallel to the z-axis. The additional container 20 is fixed at the cuff element 14 which is movably arranged on the support structure 26, which is here formed as an elongated element. The counteracting means further comprises the container 24 filled with the fluid substance 25 and connected to the rod 23 with the end plate 22 situated in the additional conatiner 20. The tool holder 1 penetrates through said container 24. The cuff element 14 comprises a fixing screw 15 which may be screwed in towards the support structure 26. The support structure 26 is here united with the actuator 10. The adjustment means 28 is provided near the additional container 20.

In this embodiment, the counteraction can be adjusted two-fold. First, the position at which the counteracting $F_C$ force applies can be varied by moving the container 24 and the additional container 20 in parallel to the z-axis. Second, the counteraction can be adjusted by varying the behavior of the additional fluid substance 21 kept inside the additional container 20. If the additional fluid substance 21 has a low viscosity, the scan excursion at given driving force $F_D$ is small and the spatial resolution of the tool movement is high. If the viscosity of the additional fluid substance 21 is high, the scan excursion at a given value of the driving force $F_D$ reaches its minimum.

Figure 9:
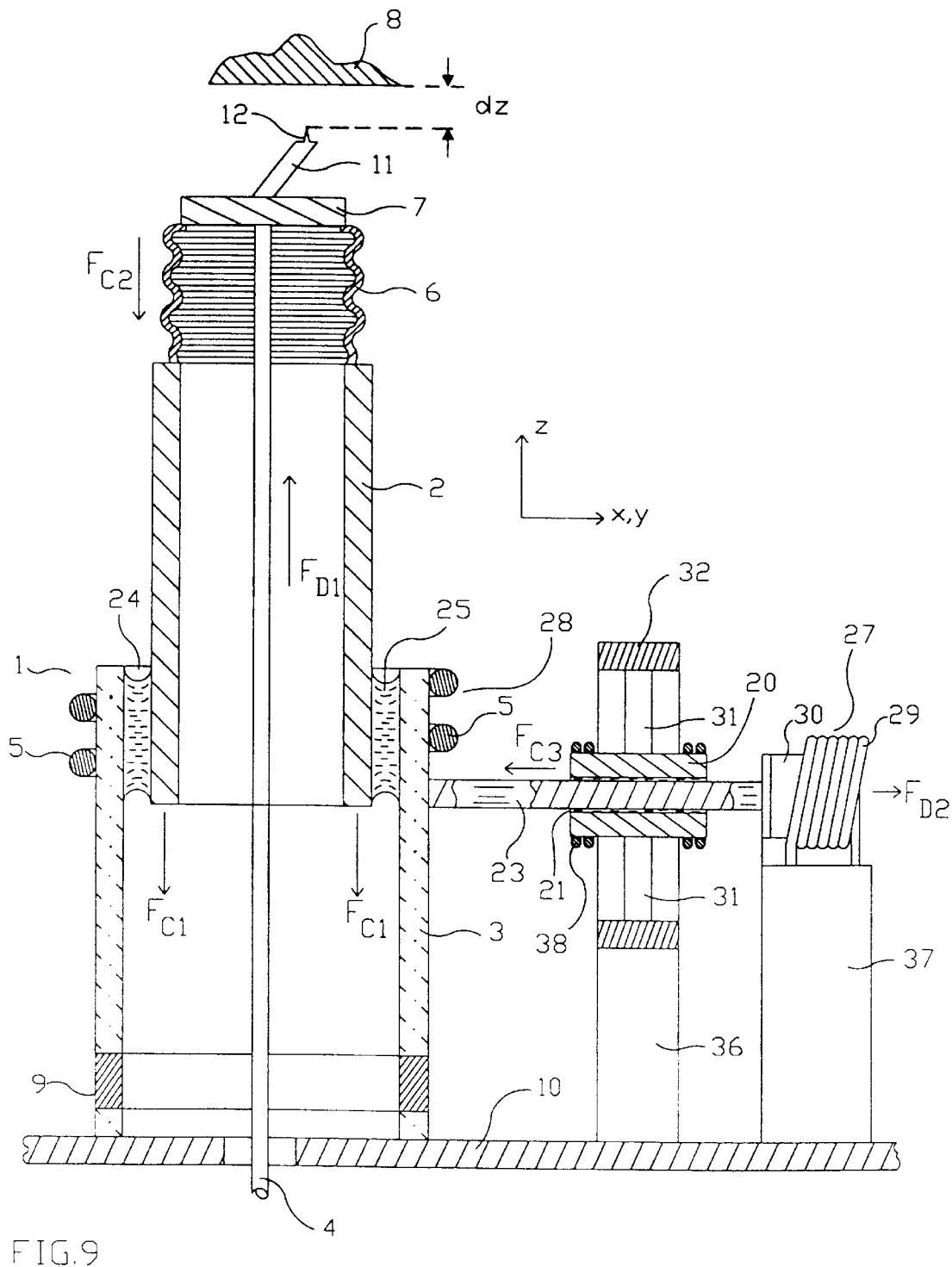
FIG. 9 shows a side view of a telescopic tool holder with cantilever and tip under exertion of a driving force $F_D$ and with a counteracting force $F_C$ part of which being induced by a fluid substance.

Another embodiment is shown in FIG. 9. The tool holder 1 here comprises two tube pieces 2, 3 which are partially telescopic to each other. The inner tube 2 has at its outer end a bellows means 6 which bears a front plate 7 on which the cantilever 11 with the tip 12 are arranged. The front plate 7 is connected to a control rod 4 which protrudes through the interior of both tube pieces 2, 3 towards the actuator 10. The fluid substance 25 is arranged inbetween the two tubes 2, 3 at the section where the tube pieces 2, 3 overlap. The dimension of the gap where the fluid substance 25 is situated is preferably chosen such that the fluid substance 25 stays between the tube pieces 2, 3 by adhesive force. The outer tube piece 3 carries a coil 5 which acts as the adjustment means 28. Further, the rod 23 is fixed at the outer tube piece 3 and is protruding through the additional container 20 which is formed as a hollow tube piece with an inner diameter which is only a little bit bigger than the diameter of the rod 23 such that a gap exists between the rod 23 and the additional container 20, the gap being filled with the additional deformable substance 21. The additional container 20 bears on its outside an additional adjustment means 38 in form of a heating coil. The additional container 20 is held in its position by means of a coaxial spoked wheel 32 with a bigger diameter than the container 20, the coaxial wheel 32 being connected to the additional container 20 via spoke elements 31. The spoke elements 31 need not have a straight shape but can be also formed e.g. in a bent shape. The spoked coaxial wheel 32 is held by a wheel holder 36. The rod 23 ends in a plate which is attached to a permanentmagnetic core 30 which immerses into the interior of a hollow coil 29. The coil 29 is fixed at a power supply 37 which provides the coil 29 with power for creating the driving force $F_D$. The coil 29 and the power supply 37, and the permanent magnetic core 30 together form the driving means 27, which acts in the horizontal x- or y-direction. Other driving means is not depicted but is certainly used for creating the z-directed driving force $F_{D1}$. The outer tube piece 3 has near its base portion a soft ring-shaped element serving as the soft section 9 which allows the tube pieces 2, 3 to be inclined in response to the driving force $F_D$. The deformable substance 25 and the container 24 together form the counteracting means. The rod 23, the spoked wheel 32 with the spokes 31, the additional fluid substance 21, the additional container 20, and the wheel holder 36 together form the assistant counteracting means.

In this embodiment, the distance $d_z$ between the tip 12 and the sample surface 8 can be controlled by controlling the behavior of the fluid substance 25. The gap formed between the tube pieces 2, 3 can be referred to as the container 24. The control rod 4 can be used to apply a force to the end plate 7. If a force pulls at the control rod 4, the control rod 4 together with the tip 12 is moved away from the sample 8, i.e. the distance $d_z$ is increased. If one pushes the control rod 4, the distance $d_z$ between tip 12 and sample 8 is reduced. By means of the coil 5, the temperature and thus the behavior of the fluid substance 25 can be controlled. If a current flows through the coil 5, the temperature of the fluid substance 25 increases because the coil 5 acts as resistive heater. The higher the temperature is, the lower the viscosity of the fluid substance 25 becomes. Damping of the z-distance movement can be achieved if the fluid substance 25 is in a state where it has a high viscosity.

The telescopic system comprising the two tube pieces 2, 3 may be used as a first stage approaching or coarse positioning drive. The tip 12 is e.g. to be moved to a predetermined target position. The driving force $F_{D1}$ is exerted via the control rod 4 directly to the front plate 7 with the cantilever 11 and the tip 12. When the viscosity of the fluid substance 25 is kept low, the friction between the tube pieces 2, 3 is minimized as well and the inner tube piece 2 is dragged via the bellows means 6 with the control rod 4. When low speed is used for the movement of the control rod 4, which is normally the case with microscopic systems, the inertia of the moved part should play a negligible role and hence not lead to an unwanted counteracting force $F_{C1}$. Of course the inertia may as well be used as a means for a wanted counteracting force $F_{C1}$ and a medium value of the viscosity of the fluid substance 25 may as well provide for the counteracting force $F_{C1}$. When a position that is sufficiently near to the target position has been reached, the viscosity of the fluid substance 25 may be increased such that the sticking force or friction between the overlapping parts of the tube pieces 2, 3 is increased as well. By this, the function of the bellows means 6 becomes apparent in that it now provides the counteracting force $FC_2$ due to the elasticity of the bellows means 6. The dimensioning of the bellows means 6 is responsible for its mechanical behavior and the counteracting force $F_{C2}$ it henceforth provides. This type of counteracting force $F_{C2}$ is of a spring type whereas the counteracting force $F_{C1}$, of the fluid substance 25 is more of a damping type. One may provide for a high spring constant of the bellows means 6 such that the counteracting force $F_{C2}$ is strong enough to effect a significant reduction in resulting tip excursion for a given value of the driving force $F_{D1}$. This means that the resulting spatial resolution of the tip movement is increased which is useable for the final fine-positioning of the tip 12 to the target position. The telescopic system may comprise even more tube pieces or telescopic stages.

Furthermore, it is here combined with an arrangement as shown in FIG. 7, namely a zoom arrangement, in that the assistant counteracting means is mechanically coupled to the outermost tube piece 3. The spoked wheel 32 is one example of a point-symmetrically acting spring which provides for a very smooth mechanical behaviour. But also e.g. an elastic membrane or any other elastic element may be used. The deformability of the additional deformable substance 21 can be varied through the additional adjustment means 38. For acting as zoom arrangement, the rod 23 is moved to the wanted position by the driving means 27 and then the viscosity is increased such that the rod 23 is approximately clamped to the spoked wheel 32. Then the spring constant of the spoked wheel and/or the wheel holder 36 is effective as the counteracting force $F_{C3}$. This force counteracts any further increase of the driving force $F_D$. But now the driving force $F_{D2}$ can be used to perform a fine-scanning movement with a very high spatial resolution.

Well suited as fluid substance 25 are viscous substances, like polymers, as mentioned above. Appropriate are polymers with a phase transition type change of the viscosity well above room temperature, preferably in the range of 50–200° C. The viscosity may preferably change many orders of magnitude within a few degrees centigrade. Also suited are substances having a melting temperature suited for use in a scanning probe system. It is an advantage of a molten substance that it usually has a low viscosity, i.e. that in its molten state there is almost no friction between the molten substance and the rod 23. By letting it cool down, or by actively cooling it down, the substance becomes stiff (frozen). In the 'frozen' state it is suited e.g. to clamp the tube pieces 2, 3 to each other. The container 24 being filled with a molten substance thus may be employed as kind of a switch for switching from one state where the counteracting force $F_C$, is low to another state where the counter-acting force $F_{C1}$, is very high.

Concerning the arrangement of tip 12, cantilever 11, and tool holder 1, any other arrangement is possible. In principle, the apparatus can also be realized by exerting the counteracting forces $F_{C123}$ directly to the cantilever 11. The counteracting forces $F_{C123}$ can generally be of any kind such as elastic or plastic deformation-derived force or any combination of it, a frictive, gravitational, kinetic, static, electrostatic, electromagnetic, hydraulic, pneumatic, chemical attractive, or repulsive force. Also any kind of gear in any form can be used to modify the force characteristic.

The cantilever 11, or even the tool 12 may be situated on an additional actuator, particularly a piezoelectric actuator which may then be used as a sort of third stage positioner with even more accuracy.

Also any combination of spring means, damping means with or without deformable substances with the tool holder, and/or the cantilever with the tip using the principle of the invention is possible. Such, the described positioning apparatus is combinable with several zooming-arrangements of the described or of any other type, with equal or with different kinetic and/or mechanical behavior, inertia, friction, gear, or any force-exerting mechanism. The mechanical behavior of the fluid substance 25 need not be restricted to its viscosity but can be of any type which effects a counterforce. As the deformable substance, any material is suited which has the ability to change its structure and its resulting mechanical behavior which is controllable though temperature or other environmental conditions such as electrical, electromagnetic, chemical, optical influence, electromagnetic radiation, etcetera. Light-sensitive sensitive materials are known which solidify when being illuminated and hence can also be used.

The control of the environmental condition can be exerted by any kind of suited control means, respectively adjustment means. Instead of heating, cooling, instead of irradiating, absorbing an existent irradiation may be used. In general, any control can be substituted by its opposite.

The tool 12 need not be a tip but can comprise any tool for investigating or manipulating a sample. It may even be a tool for holding something, such as a table or the sample itself.

The positioning apparatus may be used in STMs, AFMs, and/or local probe microscopy.

Further, a measuring means is combinable with any of the described arrangements which allows one to measure the deformability, respectively stiffness, damping, or any other value like the temperature etc. of the deformable substance 25 which delivers a measurement result that can again be used for different purposes, preferably for generating a feedback ∩ signal to be used for controlling the adjustment means 28.

The driving force $F_D$ need not be generated from outside to the tool holder 1 but can also derive from interior forces, such as forces being generated by piezoelectric effects, different temperature coefficients of combined materials (bimetals for example).

It is further possible to combine the tool holder 1 with a spring element which has a defined spring constant. This spring element can, e.g. be arranged between the tool holder i and the positioning apparatus 10. To surround such a spring element with a deformable substance is a way to control the spring constant. Generally, the deformable substance can be arranged anywhere, where it has an effect on the movement of the tool 12, e.g. between the coil and the permanent magnet of the driving means 28 or also inside of the tool holder 1.

The force function of the counteracting force $F_C$ may for instance be a rectangular function, such that in general a constant scanning velocity is achieved for the tool 12. By controlling the frequency of the rectangular function, a zooming effect is created in that the range scanned by the tool 12 is decreased.

The friction plate 18 is not obligatorily needed. Any arrangement that is designed to create a friction force is suitable. For instance the container 24 may be designed as a tube piece which is penetrated by the assistant rod 17. The elongated spring 13 may be substituted by any type of spring.

From the known magnetostrictive positioners where the magnetostrictive effect changes the dimension of a magnetic body, the here shown embodiments also differ in that in the invented positioning apparatus a movable part of an actuator is moved without changing its shape.

What is claimed is:

1. Positioning apparatus for a tool comprising means for applying a driving force causing a movement of said tool, characterized in that counteracting means are provided, comprising at least one deformable substance which is mechanically coupled to said tool and effects a counteracting force, and further comprising adjustment means for adjusting the deformability of at least one of said at least one deformable substance.

2. Positioning apparatus in accordance with claim 1, wherein said deformable substance comprises a material whose deformability can be controlled by changing an environmental condition via the adjustment means.

3. Positioning apparatus in accordance with claim 1, wherein said deformable substance is a liquid substance which changes into a solid state at a temperature below a predetermined value.

4. Positioning apparatus in accordance with claim 1, wherein said tool is attached to a cantilever.

5. Positioning apparatus in accordance with claim 4, wherein the counteracting means is arranged such that the counteracting force is acting on a tool holder carrying the cantilever.

6. Positioning apparatus in accordance with claim 5, wherein the counteracting means comprises a force-transmitting element at the tool holder interacting with the deformable substance such that the counteracting force which is transmitted via said force-transmitting element depends on the deformability of said deformable substance.

7. Positioning apparatus in accordance with claim 5, wherein the counteracting means comprises spring means mechanically coupled to the tool holder and/or the deformable substance.

8. Positioning apparatus in accordance with claim 7, characterized in that the mechanical coupling of the spring means is dependant on the deformability of the deformable substance.

9. Positioning apparatus in accordance with claim 1, wherein the counteracting means is usable to control the z-movement of the tool.

10. Positioning apparatus in accordance with claim 1, wherein the deformable substance comprises a fluid arranged in a gap between two walls designed such that the fluid is held inside the gap by adhesion and/or surface tension.

* * * * *